US011612291B2

(12) United States Patent
Marcus et al.

(10) Patent No.: US 11,612,291 B2
(45) Date of Patent: Mar. 28, 2023

(54) VACUUM CLEANER

(71) Applicant: Techtronic Floor Care Technology Limited, Tortola (VG)

(72) Inventors: Steven Marcus, Charlotte, NC (US); William Jacob Kozlowski, Jr., Waxhaw, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 113 days.

(21) Appl. No.: 17/373,500

(22) Filed: Jul. 12, 2021

(65) Prior Publication Data

US 2021/0338026 A1  Nov. 4, 2021

Related U.S. Application Data

(63) Continuation of application No. 16/142,177, filed on Sep. 26, 2018, now Pat. No. 11,058,273.

(Continued)

(51) Int. Cl.
*A47L 9/19* (2006.01)
*A47L 9/28* (2006.01)
(Continued)

(52) U.S. Cl.
CPC .................. *A47L 9/19* (2013.01); *A47L 9/12* (2013.01); *A47L 9/1683* (2013.01); *A47L 9/2805* (2013.01); *A47L 9/2821* (2013.01); *A47L 9/2857* (2013.01); *A47L 9/2894* (2013.01); *A47L 9/30* (2013.01); *B01D 46/0002* (2013.01);
(Continued)

(58) Field of Classification Search
CPC ....... A47L 9/2821; A47L 9/281; A47L 9/2857
See application file for complete search history.

(56) References Cited

U.S. PATENT DOCUMENTS

| 3,631,654 A | 1/1972 | Riely et al. |
| 3,891,417 A | 6/1975 | Wade |

(Continued)

FOREIGN PATENT DOCUMENTS

| CN | 101036568 A | 9/2007 |
| CN | 204056884 U | 12/2014 |

(Continued)

OTHER PUBLICATIONS

Extended European Search Report for Application No. 21176706.6 dated Aug. 23, 2021 (8 pages).

(Continued)

*Primary Examiner* — Andrew A Horton
(74) *Attorney, Agent, or Firm* — Michael Best & Friedrich LLP

(57) ABSTRACT

A vacuum cleaner that includes a suction source configured to generate a suction airflow, a dirt collector in fluid communication with the suction source and configured to separate debris from the suction airflow and the dirt collector is configured to store the debris separated from the suction airflow. The vacuum further includes an infrared sensor operable to output a signal corresponding to a distance to an amount of debris stored in the dirt collector, a controller that receives the signal, and the controller is operable to determine a fill level stored in the dirt collector based on the signal. A visual display displays the fill level stored in the dirt collector.

20 Claims, 9 Drawing Sheets

Related U.S. Application Data

(60) Provisional application No. 62/572,225, filed on Oct. 13, 2017, provisional application No. 62/572,229, filed on Oct. 13, 2017, provisional application No. 62/564,432, filed on Sep. 28, 2017.

(51) Int. Cl.

| | | |
|---|---|---|
| *A47L 9/16* | (2006.01) | |
| *A47L 9/12* | (2006.01) | |
| *A47L 9/30* | (2006.01) | |
| *B01D 46/00* | (2022.01) | |
| *G01F 23/292* | (2006.01) | |
| *B01D 46/42* | (2006.01) | |

(52) U.S. Cl.
CPC ..... *B01D 46/0086* (2013.01); *B01D 46/4254* (2013.01); *G01F 23/292* (2013.01); *A47L 9/2815* (2013.01); *B01D 2273/18* (2013.01); *B01D 2273/28* (2013.01); *B01D 2279/55* (2013.01)

(56) References Cited

U.S. PATENT DOCUMENTS

| | | | |
|---|---|---|---|
| 4,559,066 | A | 12/1985 | Hunter et al. |
| 5,129,923 | A | 7/1992 | Hunter et al. |
| 5,141,309 | A | 8/1992 | Worwag |
| 5,311,023 | A | 5/1994 | Means, Jr. et al. |
| 5,563,334 | A | 10/1996 | Bracht et al. |
| 6,029,309 | A | 2/2000 | Imamura |
| 6,058,560 | A | 5/2000 | Gab et al. |
| 6,237,648 | B1 | 5/2001 | Busacca et al. |
| 6,260,234 | B1 | 7/2001 | Wright et al. |
| 6,447,586 | B1 | 9/2002 | Campbell |
| 6,571,422 | B1 | 6/2003 | Gordon et al. |
| 7,012,685 | B1 | 3/2006 | Wilson |
| 7,143,467 | B2 | 12/2006 | Seith |
| 7,237,298 | B2 | 7/2007 | Reindle et al. |
| 7,424,766 | B2 | 9/2008 | Reindle et al. |
| 7,509,707 | B2 | 3/2009 | Pullins |
| 7,599,758 | B2 | 10/2009 | Reindle et al. |
| 7,673,368 | B2 | 3/2010 | Cloud, III |
| 7,770,253 | B2 | 5/2010 | Ha et al. |
| 7,785,396 | B2 | 8/2010 | Hwang et al. |
| 7,811,346 | B1 | 10/2010 | Henson |
| 7,823,249 | B2 | 11/2010 | Zahuranec et al. |
| 7,958,598 | B2 | 6/2011 | Yun et al. |
| 7,987,550 | B2 | 8/2011 | Nielsen |
| 7,992,253 | B2 | 8/2011 | Yun et al. |
| 7,998,234 | B2 | 8/2011 | Hwang et al. |
| 8,012,250 | B2 | 9/2011 | Hwang et al. |
| 8,021,452 | B2 | 9/2011 | Hwang et al. |
| 8,043,397 | B2 | 10/2011 | Hwang et al. |
| 8,043,410 | B2 | 10/2011 | Hwang et al. |
| 8,060,979 | B2 | 11/2011 | Hwang et al. |
| 8,099,825 | B2 | 1/2012 | Zahuranec et al. |
| 8,240,001 | B2 | 8/2012 | Hwang et al. |
| 8,312,593 | B2 | 11/2012 | Hwang et al. |
| 8,404,034 | B2 | 3/2013 | Hwang et al. |
| 8,689,398 | B2 | 4/2014 | Chung et al. |
| 8,726,457 | B2 | 5/2014 | Liu et al. |
| 8,726,459 | B2 | 5/2014 | Yun et al. |
| 8,821,621 | B2 | 9/2014 | Dwyer et al. |
| 9,015,897 | B2 | 4/2015 | Jonsson et al. |
| 9,089,250 | B2 | 7/2015 | Stein |
| 2002/0154809 | A1 | 10/2002 | Yamagishi et al. |
| 2004/0025285 | A1 | 2/2004 | McCormick et al. |
| 2004/0083896 | A1 | 5/2004 | Mihaylov et al. |
| 2005/0183230 | A1 | 8/2005 | Uehigashi |
| 2006/0075899 | A1 | 4/2006 | Evans |
| 2006/0150360 | A1 | 7/2006 | Reick-Mitrisin et al. |
| 2007/0084011 | A1 | 4/2007 | Cloud, III |
| 2007/0214597 | A1 | 9/2007 | Suzuki |
| 2008/0092742 | A1 | 4/2008 | Marra |
| 2008/0295685 | A1 | 12/2008 | Uhland et al. |
| 2010/0017151 | A1 | 1/2010 | Kerrigan et al. |
| 2010/0025509 | A1 | 2/2010 | Matlin et al. |
| 2010/0084347 | A1 | 4/2010 | Wilder et al. |
| 2010/0192772 | A1 | 8/2010 | Poon |
| 2010/0236014 | A1 | 9/2010 | Fester et al. |
| 2010/0293742 | A1 | 11/2010 | Chung et al. |
| 2011/0271480 | A1 | 11/2011 | Kara et al. |
| 2012/0125592 | A1 | 5/2012 | Fadell et al. |
| 2012/0152280 | A1* | 6/2012 | Bosses ............... A47L 9/2805 134/6 |
| 2012/0169497 | A1 | 7/2012 | Schnittman et al. |
| 2012/0234169 | A1 | 9/2012 | Painter et al. |
| 2013/0186279 | A1 | 7/2013 | Dwyer et al. |
| 2013/0231606 | A1 | 9/2013 | Stearns et al. |
| 2013/0283563 | A1 | 10/2013 | Fry et al. |
| 2013/0289919 | A1 | 10/2013 | Wilson, Jr. et al. |
| 2015/0230680 | A1 | 8/2015 | Li et al. |
| 2015/0273382 | A1 | 10/2015 | Stoner, Jr. et al. |
| 2016/0121251 | A1 | 5/2016 | Baek et al. |
| 2016/0136557 | A1 | 5/2016 | Ragaller et al. |
| 2016/0216154 | A1 | 7/2016 | Hofmeister et al. |
| 2017/0000305 | A1 | 1/2017 | Gordon et al. |
| 2017/0001137 | A1 | 1/2017 | Lans |
| 2017/0095762 | A1 | 4/2017 | Wolowicz |
| 2017/0138832 | A1 | 5/2017 | Maguire-Boyle et al. |
| 2017/0273526 | A1 | 9/2017 | Love et al. |
| 2018/0050926 | A1 | 2/2018 | Ruprecht |
| 2018/0055315 | A1 | 3/2018 | Conrad |
| 2018/0055316 | A1 | 3/2018 | Noehr Larsen et al. |
| 2018/0055325 | A1 | 3/2018 | Yoon et al. |
| 2018/0361295 | A1 | 12/2018 | Legare et al. |
| 2019/0090036 | A1 | 3/2019 | Scope et al. |

FOREIGN PATENT DOCUMENTS

| | | |
|---|---|---|
| CN | 104857780 A | 8/2015 |
| CN | 106115119 A | 11/2016 |
| CN | 206318279 U | 7/2017 |
| DE | 102005045544 A1 | 3/2007 |
| DE | 102012110758 A1 | 5/2014 |
| EP | 1023864 A2 | 8/2000 |
| JP | 2003339583 A | 12/2003 |
| KR | 20110010359 A | 2/2011 |
| WO | 2007086744 A1 | 8/2007 |
| WO | 2012019734 A1 | 2/2012 |

OTHER PUBLICATIONS

Invitation to Pay Additional Fees and Partial Search Report for Application No. PCT/US2018/052811 dated Mar. 7, 2019 (14 pages).
International Search Report and Written Opinion for Application No. PCT/US2018/052811 dated Apr. 30, 2019 (19 pages).
United States Patent Office Non Final Office Action for U.S. Appl. No. 16/142,201 dated Jul. 27, 2020 (10 pages).
United States Patent Office Non Final Office Action for U.S. Appl. No. 16/142,201 dated Nov. 18, 2020 (13 pages).
Chinese Patent Office Action for Application No. 201880063303.4 dated Dec. 21, 2020 (10 pages including statement of relevance).
Chinese Patent Office Action for Application No. 201880063303.4 dated Jul. 8, 2021 (7 pages including statement of relevance).
Chinese Patent Office Action for Application No. 201880063303.4 dated Nov. 11, 2021 (6 pages including statement of relevance).
United States Patent Office Final Action for U.S. Appl. No. 17/392,794 dated Feb. 6, 2023 (10 pages).

* cited by examiner

VACUUM CLEANER

CROSS-REFERENCE TO RELATED APPLICATIONS

This application is a continuation of U.S. patent application Ser. No. 16/142,177, filed on Sep. 26, 2018, which issued as U.S. Pat. No. 11,058,273 on Jul. 13, 2021, which claims priority to U.S. Provisional Patent Application No. 62/564,432, filed Sep. 28, 2017 and to U.S. Provisional Patent Application No. 62/572,225, filed Oct. 13, 2017 and to U.S. Provisional Patent Application No. 62/572,229, filed Oct. 13, 2017, the entire contents all of which are hereby incorporated by reference herein.

BACKGROUND

The present invention relates to vacuum cleaners.

Vacuum cleaners typically include a suction source and a dirt collector that separates and stores debris from a suction air stream generated by the suction source. It can be difficult for the user to know when the amount of debris in the dirt collector affects performance and therefore it can be difficult for the user to know when to empty or replace the dirt collector.

SUMMARY

In one embodiment, a vacuum cleaner includes a suction source configured to generate a suction airflow, a dirt collector in fluid communication with the suction source and configured to separate debris from the suction airflow and the dirt collector is configured to store the debris separated from the suction airflow. The vacuum further includes an infrared sensor operable to output a signal corresponding to a distance to an amount of debris stored in the dirt collector, a controller that receives the signal, and the controller is operable to determine a fill level stored in the dirt collector based on the signal. A visual display displays the fill level stored in the dirt collector.

In another embodiment, a vacuum cleaner includes a suction source configured to generate a suction airflow, a dirt collector in fluid communication with the suction source and configured to separate debris from the suction airflow and the dirt collector is configured to store the debris separated from the suction airflow. The vacuum cleaner further includes a second sensor operable to output a first signal corresponding to an amount of debris stored in the dirt collector, a first sensor operable to output a second signal corresponding to a pressure within the dirt collector, and a controller that receives the first and second signals, the controller operable to determine a fill level of the dirt collector based on the first and second signals.

In another embodiment, a vacuum cleaner includes a suction source configured to generate a suction airflow, a dirt collector in fluid communication with the suction source and configured to separate debris form the suction airflow, a sensor operable to output a signal corresponding to an amount of debris stored in the dirt collector, a controller that receives the signal. The controller is operable to determine a fill level of the dirt collector based on the signal. A visual display is located on the dirt collector and the visual display is operable to display the fill level of the dirt collector.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
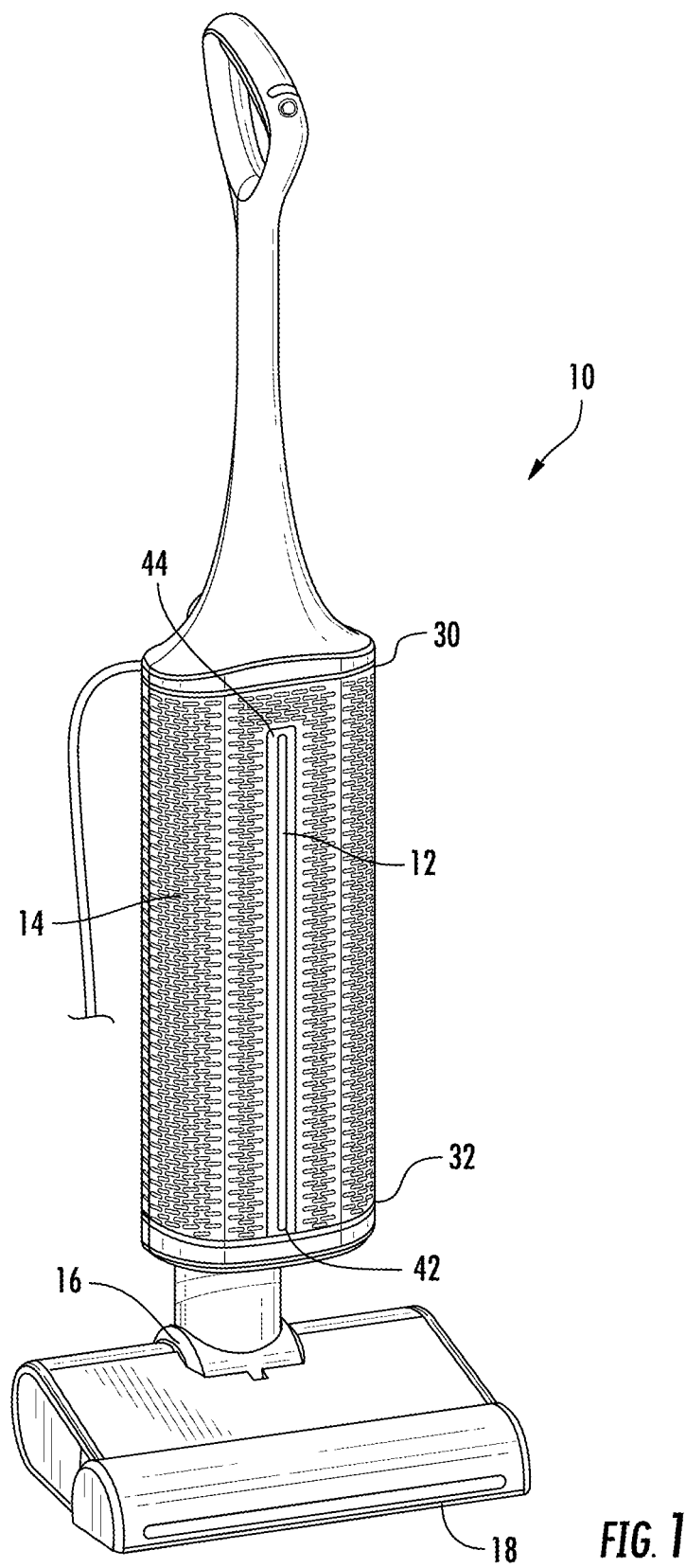
FIG. 1 is a perspective view of a vacuum cleaner according to an embodiment.

FIG. 1 illustrates a vacuum cleaner 10. As will be discussed in more detail below, the vacuum cleaner 10 includes a visual display 12 located on a front side of a dirt collector 14 of the vacuum 10 that indicates to the user a fill level of the dirt collector 14. Therefore, the user can monitor the fill level of the dirt collector 14 during use of the vacuum 10 to determine when to empty or replace the dirt collector 14.

The illustrated vacuum cleaner 10 includes a suction source 16 and a suction nozzle 18. The suction source 16 generates a suction airflow through the nozzle 18 to draw debris from the surface being cleaned through the nozzle 18 with the suction airflow. The suction source 18 includes a fan and a motor. In some embodiments, the motor is a battery powered motor and in other embodiments, the motor is an alternating current motor. Also, in the illustrated embodiment, the suction source 16 is located in the suction airflow path between the nozzle 18 and the dirt collector 14. In other embodiments, the suction source 16 can be positioned downstream or after the dirt collector in the suction airflow path.

Figure 6:
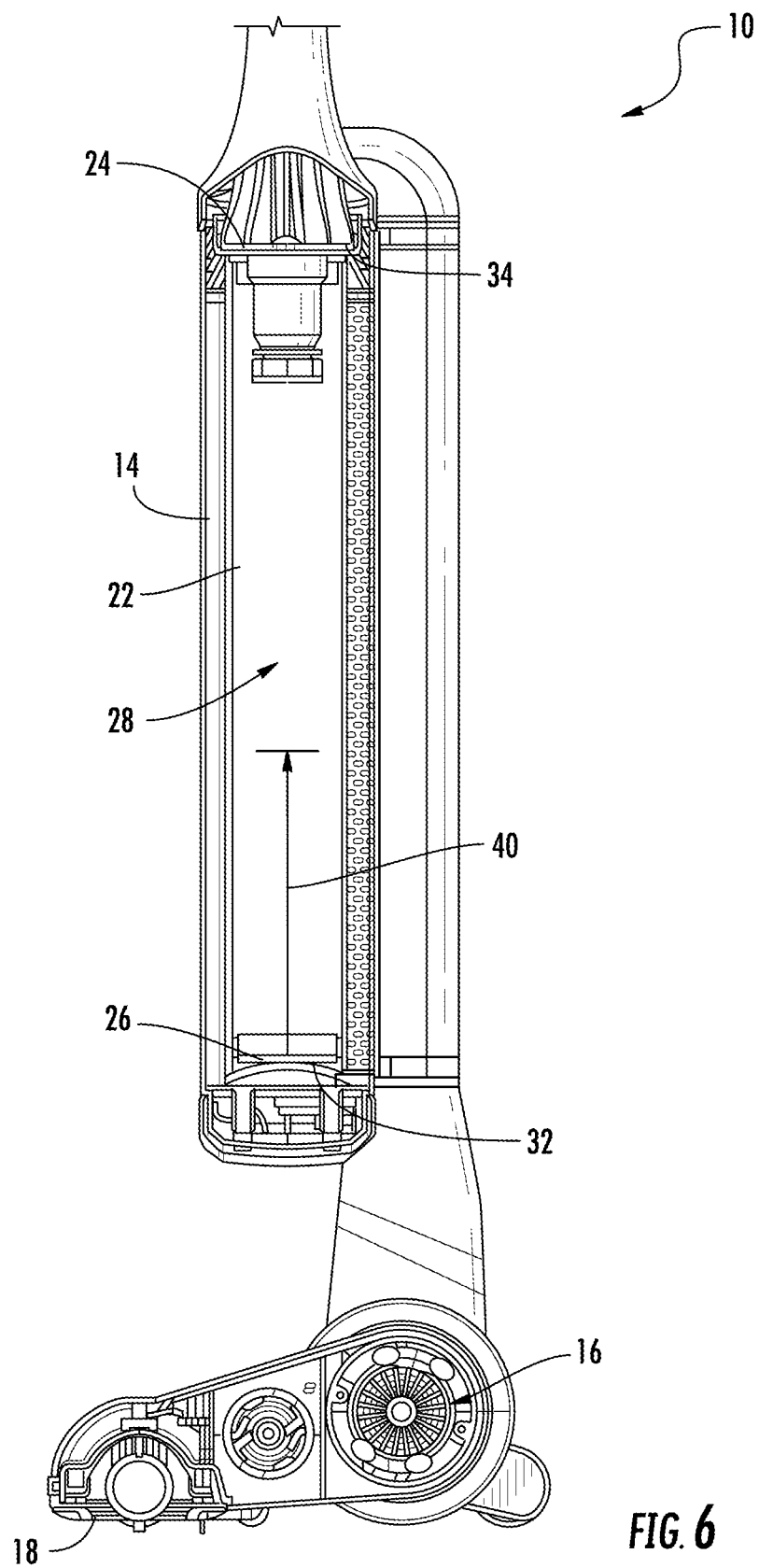
FIG. 6 is a cross-sectional view of the vacuum cleaner of FIG. 1.
Figure 7:
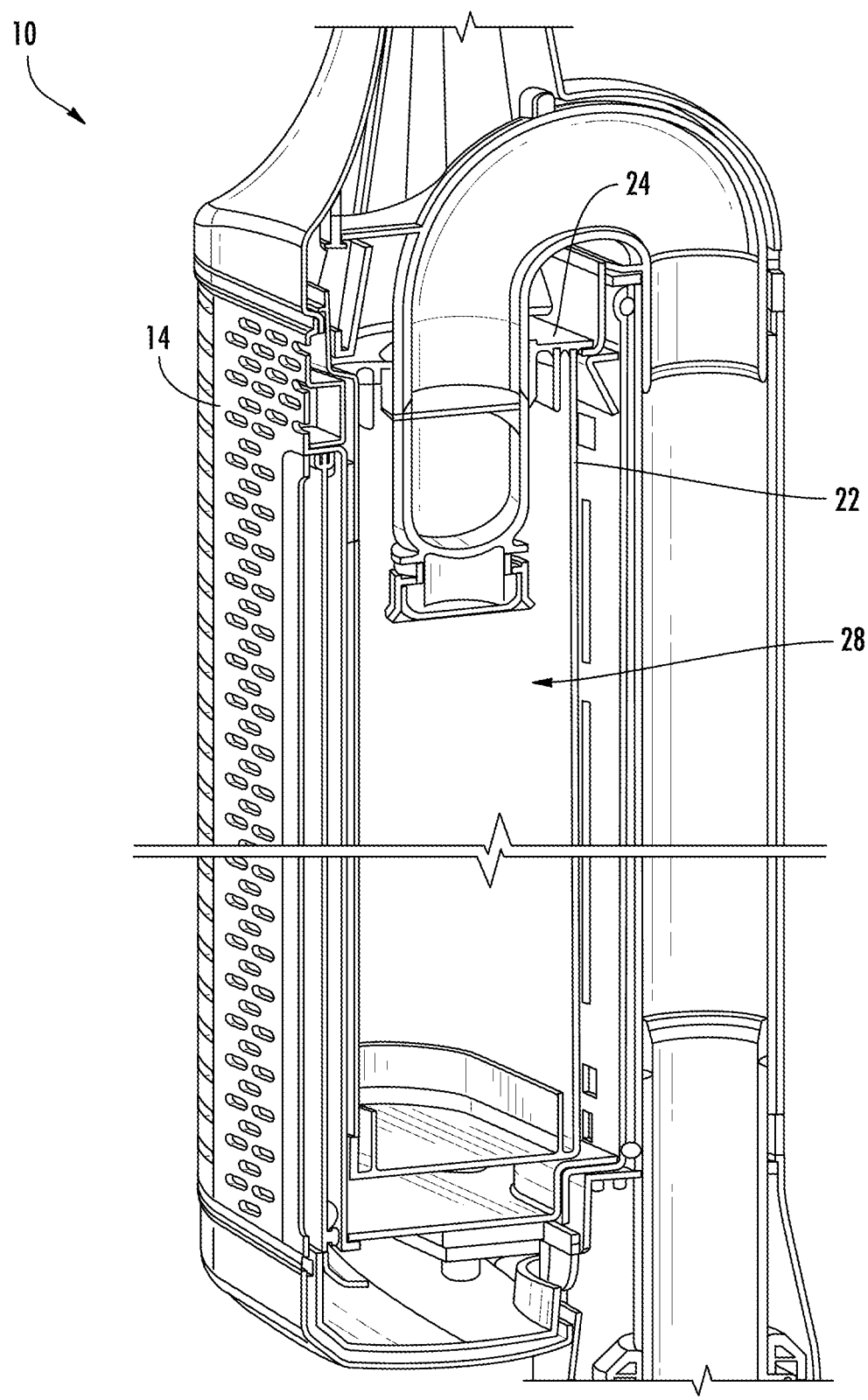
FIG. 7 is a top perspective view of the cross-section of FIG. 6.
Figure 8:
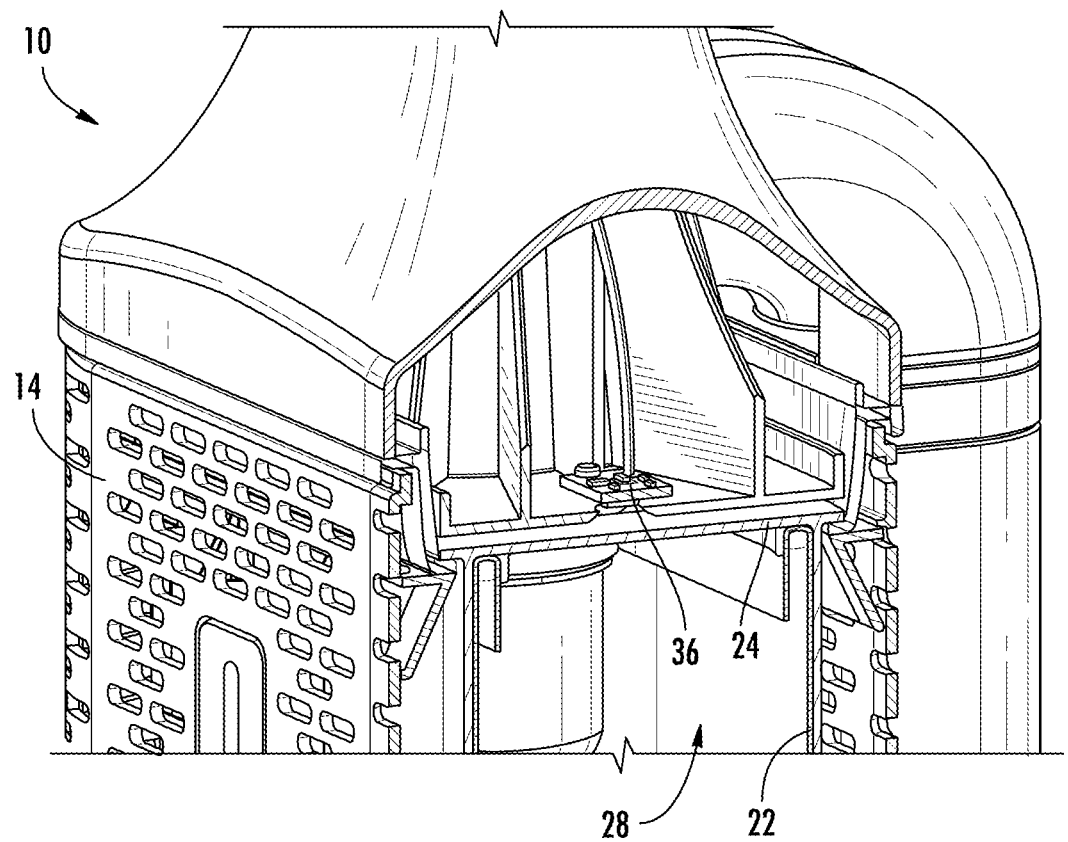
FIG. 8 is an alternative top perspective view of the cross-section of FIG. 6.

The dirt collector 14 is in fluid communication with the suction source 16 and the nozzle 18. The dirt collector 14 separates the debris from the suction airflow and stores the separated debris. Referring to FIGS. 6 and 7, in the illustrated embodiment, the dirt collector 14 includes a top housing or end cap 24 and an air-permeable filter media 22 extending from the housing 24 such that the filter media 22 and housing 24 at least partially define a collection volume. In the illustrated embodiment, the dirt collector 14 includes a bottom housing or end cap 26 and the filter media 22 extends between the top housing or end cap 24 and bottom housing or end cap 26. The filter media 22 is air permeable so that the filter media 22 allows clean air to exit the filter media 22 while retaining the debris inside a storage volume 28 defined by the media 28 and the end caps 24, 26. In the illustrated embodiment, the end caps 24, 26 are generally not air permeable. Also, although the illustrated dirt collector 14 includes a filter media 22, in other embodiments, the dirt collector can include a cyclonic separator or a combination of a cyclonic separator and a filter or filters.

With continued reference to FIG. 6, the dirt collector 14 includes a top end 30 and a bottom end 32. Generally, the dirt collector 14 is filled with debris starting at the bottom end 32 and as the amount of debris stored increases, the fill level rises toward the top end 30. Thus the dirt collector fill level can be determined by measuring the fill level as it rises toward the top end 30. The dirt collector fill level can also be determined by measuring a differential pressure across the filter media 22. That is, the difference in pressure between the pressure in the storage volume 28 or in the airflow path and the atmospheric pressure outside the storage volume (or inside the storage volume 28 when the suction source 16 is not operating) can be correlated to the fill level. Or, as will be discussed in more detail below, in the illustrated embodiment, the dirt collector fill level is a function of both the differential pressure and the amount of debris in the storage volume 28.

Referring to FIGS. 4-8, the vacuum cleaner 10 further includes a first sensor 34, a second sensor 36, and a controller 38 that receives signals from the sensors 34 and 36. The first sensor 34 in the illustrated embodiment is a pressure sensor that senses the pressure inside the storage volume 28, discussed above. In the illustrated embodiment, the second sensor provides a signal indicative of a distance between the sensor and an amount of debris in the storage volume. The second sensor 36 in the illustrated embodiment includes an infra-red (IR) sensor, but optionally could utilize other wavelengths of electromagnetic radiation or may be an ultra-sonic sensor or a camera. The IR sensor 36 is located at the top end 30 of the dirt collector 14 and faces down toward the bottom end 32. In the illustrated embodiment, the IR sensor 36 includes an emitter of an infrared light and a detector. The emitter may direct the IR beam having a beam angle between about 5 and 165 degrees. In the illustrated embodiment, the beam angle is between about 15 and 60 degrees, more particularly is approximately 30 degrees. The IR sensor includes a detector to sense light reflected back from the debris and received by the detector, whereby the sensor provides a signal indicative of the distance to the debris. At least a portion of the top housing 24 of the current embodiment is transmissive of electromagnetic radiation, specifically transmissive of infrared radiation, so that the IR sensor 36 is placed outside the storage volume 28 and the IR light beam travels through the transmissive housing 24 for the sensor to sense the amount of debris within the storage volume 28. The housing may be formed of an electromagnetic radiation transmissive material, or a window in the housing or a portion of the housing may be formed of an electromagnetic radiation transmissive material. In any event, the electromagnetic radiation transmissive material is selected to be transmissive of the wavelength emitted by the selected sensor and having a percent transmission selected for the sensor to provide a signal indicative of the distance to the debris. In the illustrated embodiment, the housing is formed of a material that transmits infrared radiation of a wavelength between 750 and 3000 nanometer (nm), and a percent transmission of infrared radiation of greater than or equal to 50% measured at the selected sensor wavelength. Alternatively, the material may have a percent transmission of infrared radiation of greater than or equal to 65% measured at the selected sensor wavelength. Alternatively, the material may have a percent transmission of infrared radiation of greater than or equal to 80% measured at the selected sensor wavelength.

In the illustrated embodiment, the selected sensor is an IR sensor emitting a wavelength between 800 and 1000 nanometer (nm), and in one example is 850 nanometer (nm). In the illustrated embodiment, the housing material is an IR transmissive polycarbonate having a material thickness less than 2 millimeters (mm). The transmissive housing material may have a thickness between 1 and 2 millimeters (mm). In some embodiments, the transmissive housing material may have a thickness between ½ and 2 millimeters (mm). In another alternative, the transmissive housing material may be acrylic or other infrared transmissive materials. In one embodiment, the housing 24 material includes MAKROLON 2805.

Optionally, the transmissive housing material may be transparent or translucent. In other embodiments, the second sensor 36 can include a pressure sensor, an opacity sensor, an electromagnetic radiation sensor, an ultra-sonic sensor, or a camera providing a signal indicative of an amount of debris in the dirt collector.

The controller 38 receives signals from the sensors 34, 36 and processes the signals to determine a dirt collector fill level. The controller 38 then outputs the dirt collector fill level to the visual display 12. In the illustrated embodiment, the dirt collector fill level is a function of the bottom to top fill amount 40 (FIG. 6) of debris in the storage volume 28 and the differential pressure across the filter media 22. In other embodiments, the dirt collector fill level may be based on only one of these variables or one of these variables in combination with another variable.

Figure 2:
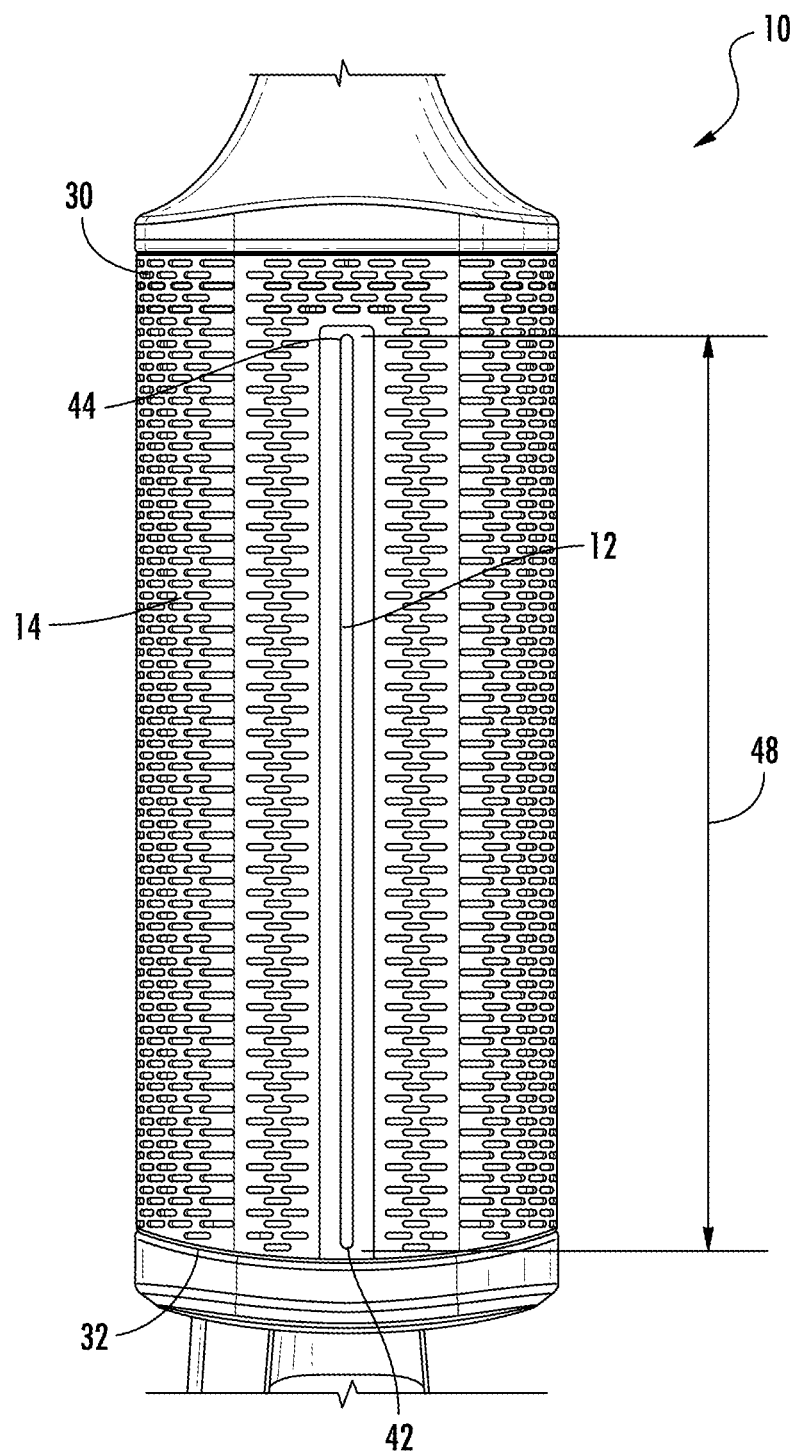
FIG. 2 is a front side view of a portion of the vacuum cleaner of FIG. 1.
Figure 3:
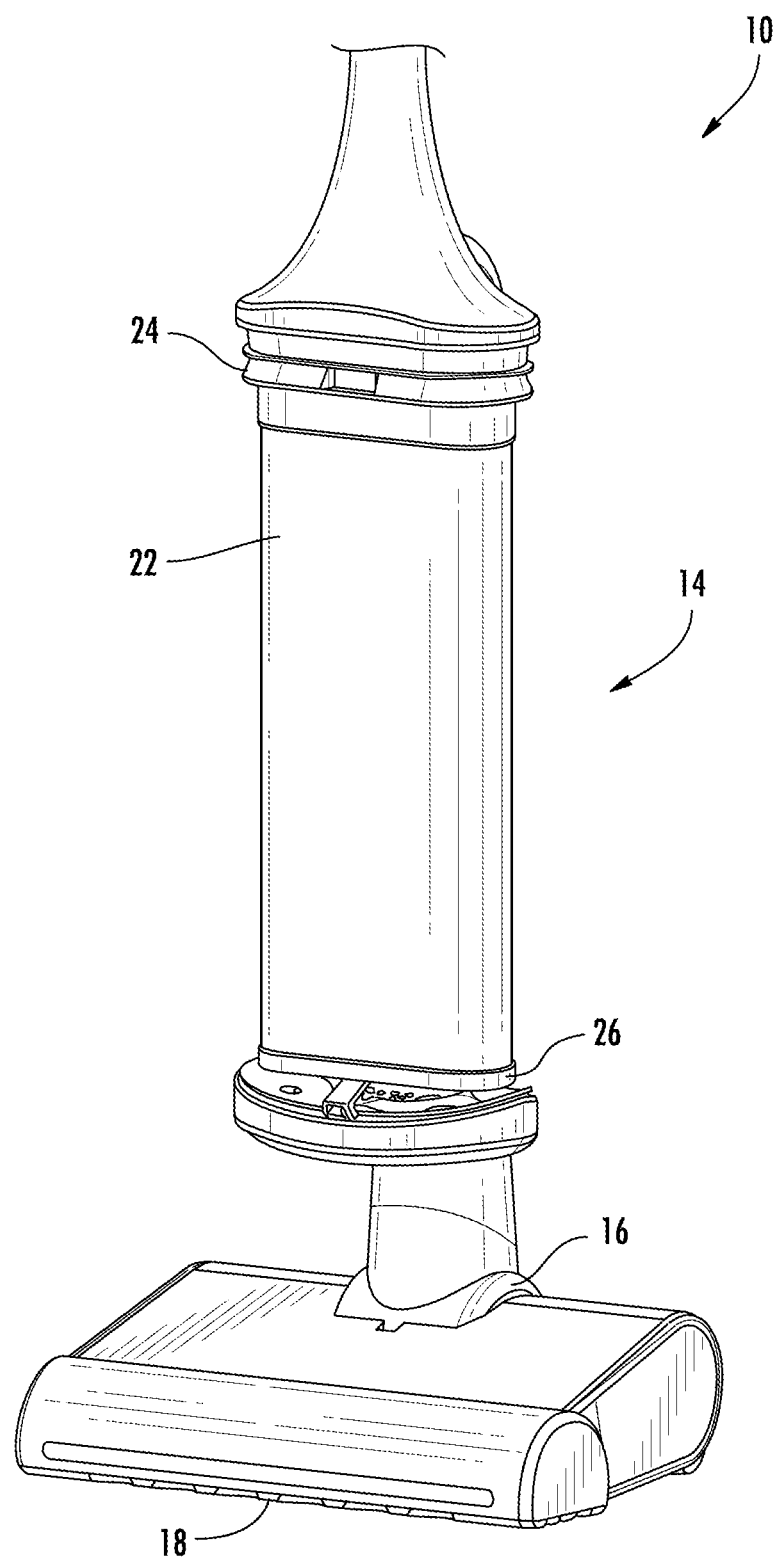
FIG. 3 is a perspective view of the vacuum cleaner of FIG. 1 with an outer housing of a dirt collector removed.
Figure 4:
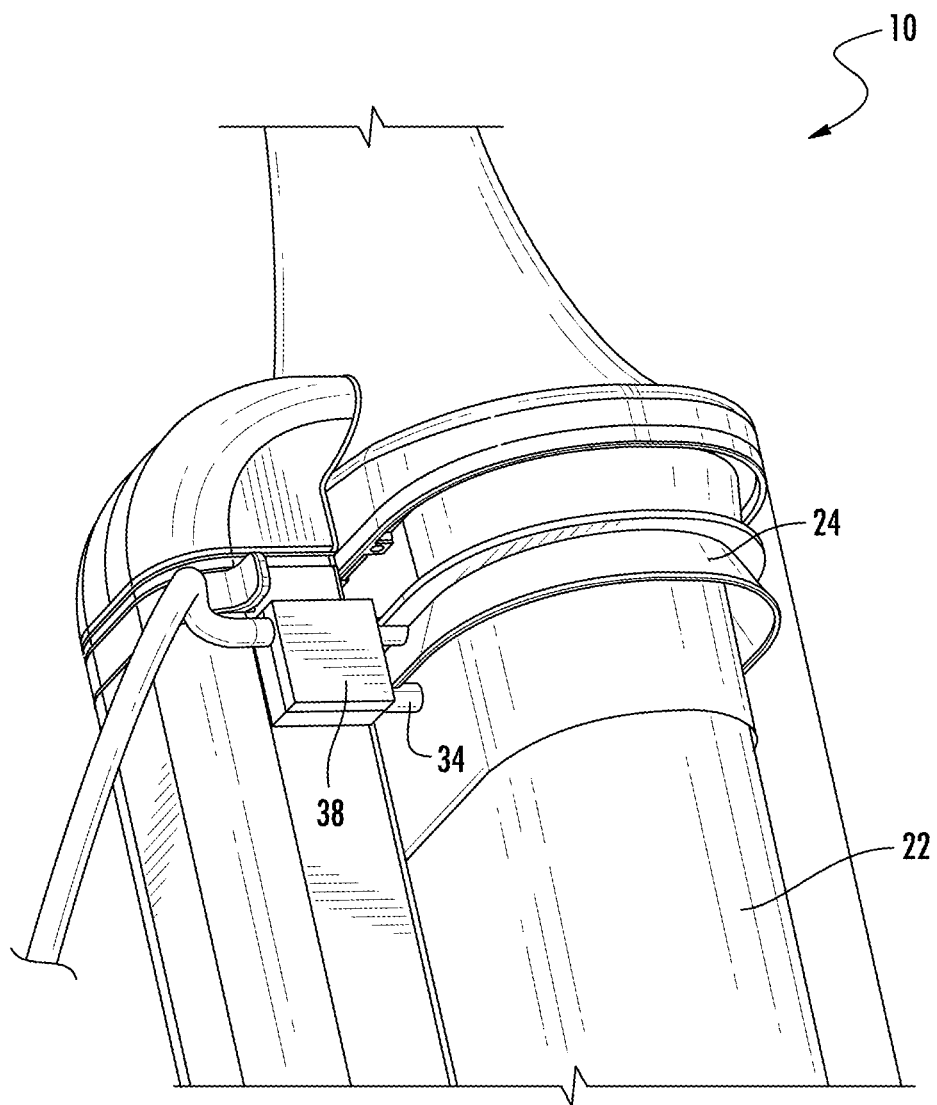
FIG. 4 is an enlarged view of a portion of the vacuum cleaner of FIG. 1 with the outer housing of the dirt collector removed.
Figure 5:
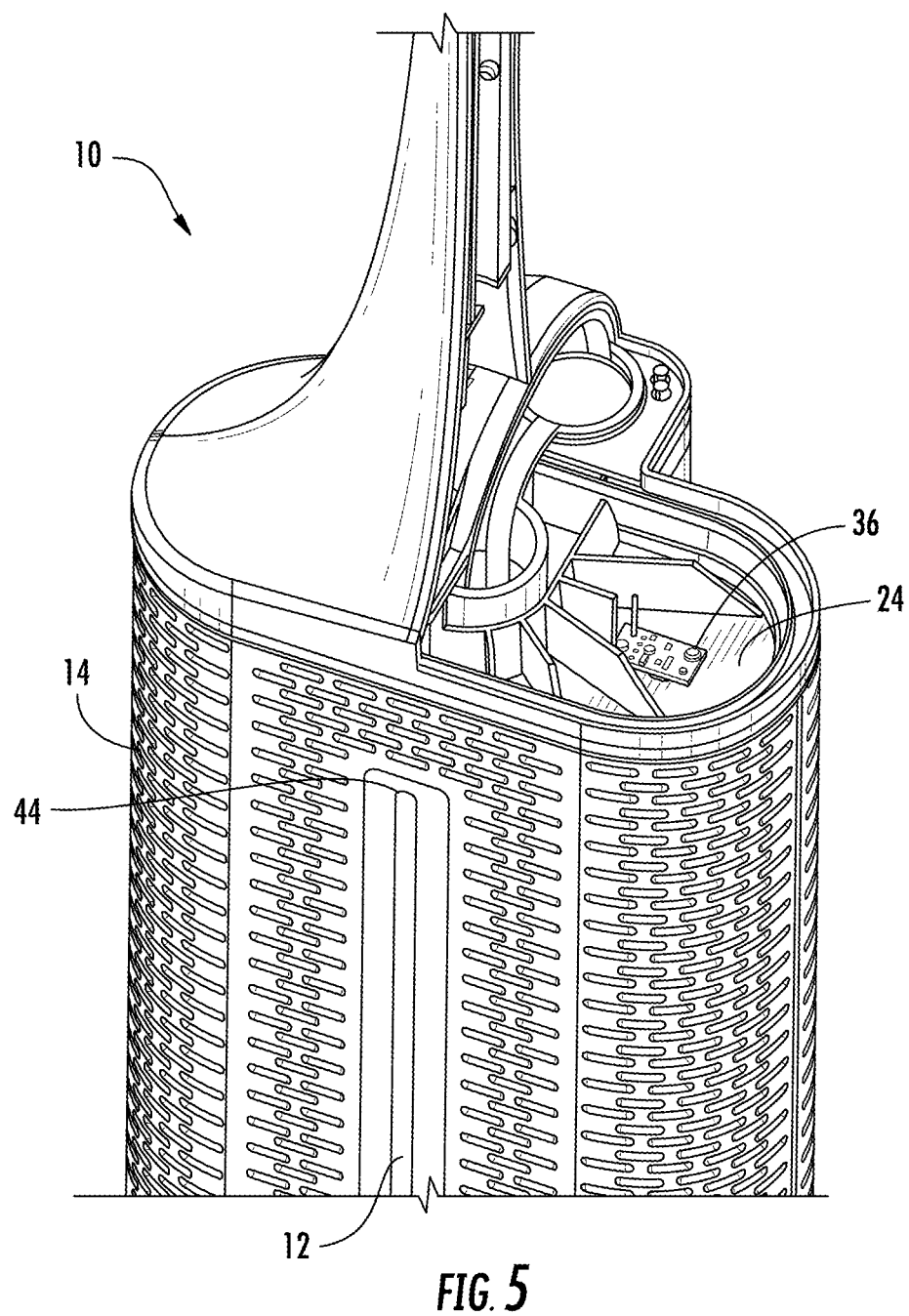
FIG. 5 is a top perspective view of the vacuum cleaner of FIG. 1 with a handle removed.

Referring to FIGS. 1 and 2, the visual display 12 displays the dirt collector fill level determined by the controller 38. The visual display 12 includes a first or lower end 42 adjacent the bottom end 32 of the dirt collector 14 and a second or upper end 44 adjacent the top end 30 of the dirt collector 14. In the illustrated embodiment, the visual display 12 includes an array of light emitting diodes (LEDs) that extends from the first end 42 to the second end 44 of the display 12. The LEDs provide an indicator that travels from the bottom end 42 to the upper end 44 as the dirt collector fill level increases to indicate to the user the fill level. In the illustrated example, the LED indicator lights up from the bottom end 42 to the upper end 44 generally corresponding to the increasing dirt collector fill level to indicate to the user the fill level.

Figure 9:
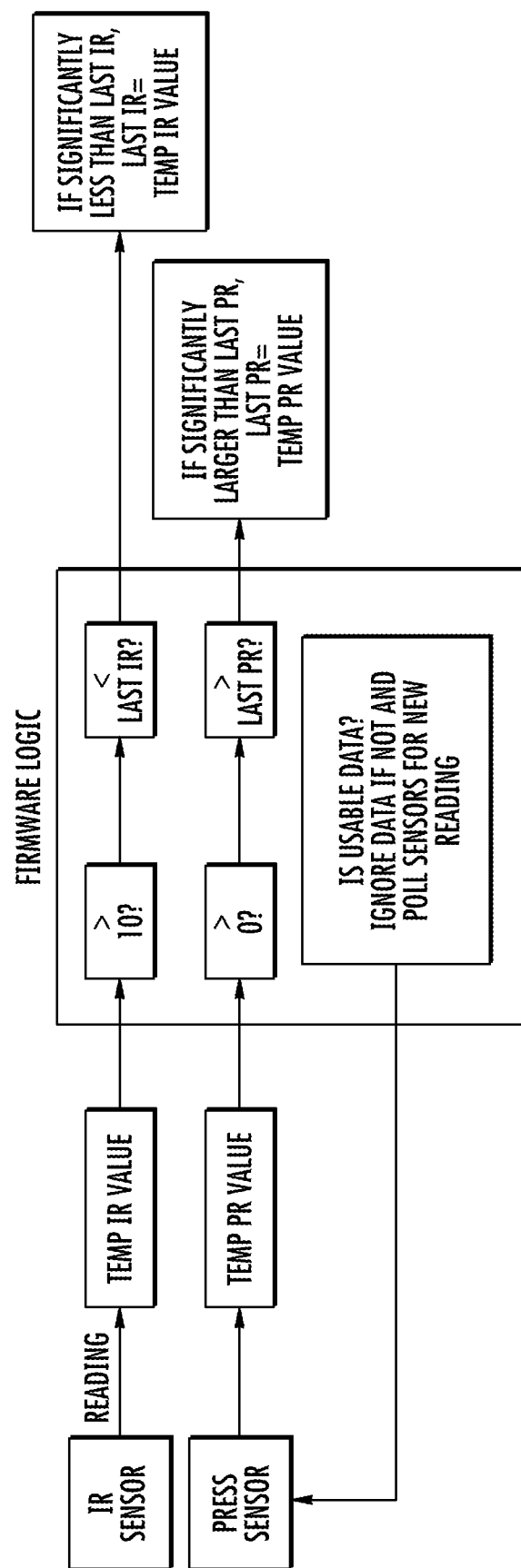
FIG. 9 is a diagram illustrating one method of operating the vacuum cleaner of FIG. 1.

FIG. 9 illustrates one possible firmware logic diagram of the controller 38 to determine the dirt collector fill level as a function of the signals from the pressure sensor 34 and the IR sensor 36. As illustrated in FIG. 9, the controller 38 uses the signals from the first sensor 34 (pressure sensor in illustrated embodiment) and the second sensor 36 (IR sensor in illustrated embodiment) to determine the dirt collector fill level. In the illustrated embodiment, the controller 38 determines a first fill level based on the first sensor 34 signal and a second fill level based on the second sensor 36 signal. The controller 38 determines the higher of the first and second fill levels to be a container fill level amount. Then, the controller outputs the container fill level amount to the visual display 12. For example, in one possible operation, if the first sensor indicates a 40 percent fill level calculated from a pressure in the dirt collector and if the second sensor indicates a 75 percent fill level calculated from a distance between the sensor and the amount of debris in the storage volume, then the controller would output a 75 percent container fill level amount to the display. Referring to FIG. 2, the visual display 12 has a length 48 measured from the bottom end 42 to the top end 44. If the controller 38 determines that the dirt collector 14 is 75 percent full, then 75 percent of the length 48 of the LEDs, starting from the bottom end 42, will be lit to indicate 75 percent full dirt collector 14 to the user.

Referring to FIG. 6, a 75 percent fill level may or may not equal 75% of the bottom to top volumetric fill amount 40 of the storage volume 28 because the percent fill level is also a function of the pressure sensed by the sensor 34. For example, the user may use the vacuum 10 to collect very fine debris that has a relatively low volume but attaches to the filter media 22 and increases the differential pressure across the filter media more rapidly than coarse or large debris. Therefore, the visual display could display 100 percent fill level when the bottom to top fill amount 40 is still relatively low. Furthermore, it should be understood that the fill level display 12 may include a scale from 0%-100% (or similar) that is a graphical representation of the fill level and not the actual distance 40 (FIG. 6).

In some embodiments, the controller 38 uses an average of outputs from the first and second sensors 34, 36 to determine the fill level. For example, the controller determines the first fill level based on the first sensor signal and the second fill level based on the second sensor signal, and then determines an average of the first and second fill levels to be the displayed fill level amount. In other embodiments, the controller uses a formula or look-up table to combine the first and second sensor outputs based on empirical or other information including sensor reliability, sensor accuracy, and system attributes of the first and second sensors and the vacuum cleaner. For one example, the fill level determined by a pressure reading may be adjusted by a function of the distance between the sensor and an amount of debris in the storage volume measured by the second sensor. In another example, the IR sensor accuracy may diminish as the dirt container fills, and the controller may adjust the IR distance measurement as a function of the pressure differential measured by the first sensor. Other system and performance attributes may be taken into account in determining the container fill level. In yet another embodiment, the controller determines the displayed fill level amount based on one of the two sensors alone until the other of the sensors reaches a threshold, after which time the displayed fill level is determined by a function of both the first sensor signal and the second sensor signal as described. For example, the displayed fill level may be based on the IR sensor signal alone until the differential pressure measured by the pressure sensor reaches a predetermined threshold, after which time the displayed fill level is determined by a function of both the pressure and IR sensor signals.

Various features and advantages of the invention are set forth in the following claims.

What is claimed is:

1. A vacuum cleaner comprising:
   a suction source configured to generate a suction airflow;
   a dirt collector in fluid communication with the suction source and configured to separate debris from the suction airflow and the dirt collector configured to store the debris separated from the suction airflow;
   a first sensor operable to output a first signal corresponding to a pressure within the dirt collector;
   a second sensor operable to output a second signal corresponding to a distance between the second sensor and an amount of debris stored in the dirt collector; and
   a controller that receives the first and second signals, the controller operable to determine a fill level of the dirt collector based on the first and second signals.

2. The vacuum cleaner of claim 1, wherein the second sensor includes an infrared sensor and the first sensor includes an air pressure sensor.

3. The vacuum cleaner of claim 1, wherein the controller is operable to determine a first fill level based on the first sensor signal and a second fill level based on the second sensor signal, wherein the fill level of the dirt collector is the higher of the first and second fill levels.

4. The vacuum cleaner of claim 1, wherein the controller determines the fill level using a combination of the outputs from the first and second sensors.

5. The vacuum cleaner of claim 1, further comprising a visual display located on the dirt collector, the visual display operable to display the fill level of the dirt collector determined by the controller.

6. The vacuum cleaner of claim 5, wherein in the visual display includes a first end and a second end and the visual display includes an indicator that travels from the first end toward the second end as the dirt collector fill level increases.

7. The vacuum cleaner of claim 6, wherein the indicator includes an array of light emitting diodes.

8. The vacuum cleaner of claim 6, wherein the dirt collector includes a bottom end and a top end, wherein the first end of the visual display is adjacent the bottom end and the second end of the visual display is adjacent the top end.

9. The vacuum cleaner of claim 8, wherein the dirt collector has a length measured from the bottom end to the top end, wherein the visual display includes a series of lights that extends along the length of the dirt collector.

10. The vacuum cleaner of claim 5, wherein the visual display includes an array of light emitting diodes, and wherein an amount of light emitting diodes that are lit corresponds to the fill level of the dirt collector.

11. The vacuum cleaner of claim 1, wherein the dirt collector includes a top end and a bottom end, wherein the second sensor is located adjacent the top end and faces toward the bottom end to sense the amount of debris stored in the dirt collector.

12. The vacuum cleaner of claim 11, wherein the second sensor includes an infrared sensor.

13. The vacuum cleaner of claim 1, wherein the second sensor includes an ultra-sonic sensor.

14. The vacuum cleaner of claim 1, wherein the second sensor includes a camera.

15. The vacuum cleaner of claim 1, wherein the second sensor utilizes sound waves.

16. The vacuum cleaner of claim 1, wherein the second sensor is configured to sense opacity.

17. The vacuum cleaner of claim 1, wherein the controller determines the fill level using an average of the outputs from the first and second sensors.

18. The vacuum cleaner of claim 1, wherein the controller determines the fill level using a formula or look-up table to combine the first and second sensor outputs based on empirical or other information including sensor reliability, sensor accuracy, and system attributes.

19. The vacuum cleaner of claim 1, wherein the dirt collector includes, a housing, and an air-permeable filter media extending from the housing such that the filter media and housing at least partially define a collection volume, the housing having an inlet opening in fluid communication with the volume, and at least a portion of the housing is transmissive of infrared radiation.

20. The vacuum cleaner of claim 19, wherein the portion of the housing that is transmissive of infrared radiation is translucent or transparent.

\* \* \* \* \*